US012531364B2

(12) United States Patent
Nozaki et al.

(10) Patent No.: US 12,531,364 B2
(45) Date of Patent: Jan. 20, 2026

(54) CONNECTOR WITH SLIDING CIRCUMFERENTIALLY ROTATING INNER HOUSING

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinji Nozaki, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 289 days.

(21) Appl. No.: 18/286,530

(22) PCT Filed: Apr. 15, 2022

(86) PCT No.: PCT/JP2022/017897
§ 371 (c)(1),
(2) Date: Oct. 11, 2023

(87) PCT Pub. No.: WO2022/220293
PCT Pub. Date: Oct. 20, 2022

(65) Prior Publication Data

US 2024/0195115 A1 Jun. 13, 2024

(30) Foreign Application Priority Data

Apr. 16, 2021 (JP) ................................ 2021-069467

(51) Int. Cl.
*H01R 13/508* (2006.01)
*H01R 12/91* (2011.01)
(Continued)

(52) U.S. Cl.
CPC .......... *H01R 13/508* (2013.01); *H01R 12/91* (2013.01); *H01R 13/2421* (2013.01);
(Continued)

(58) Field of Classification Search
CPC .. H01R 13/508; H01R 12/91; H01R 13/2421; H01R 13/4538; H01R 12/714; H01R 13/2471; H01R 13/24
See application file for complete search history.

(56) References Cited

U.S. PATENT DOCUMENTS 6,575,764 B1 6/2003 Reipur
12,294,172 B2 * 5/2025 Jeffries .............. H01R 13/6315
(Continued)

FOREIGN PATENT DOCUMENTS

JP 2003-045541 A 2/2003
JP 2011-222338 A 11/2011
(Continued)

OTHER PUBLICATIONS

Machine Translation WO 2018116568 A1 (dated Jun. 28, 2018) (Year: 2025).*

(Continued)

*Primary Examiner* — Travis S Chambers
(74) *Attorney, Agent, or Firm* — Venjuris, P.C.

(57) ABSTRACT

It is aimed to provide a connector capable of reducing cost. A connector (10) is provided with an outer housing (20), an inner housing (60) arranged movably in an advance/retreat direction with respect to the outer housing (20), a terminal (80) held in the inner housing (60), a tip part of the terminal projecting from an end surface (61) of the inner housing
(Continued)

(60), and a biasing member arranged between the outer housing (20) and the inner housing (60) for biasing the inner housing (60) toward an advance side. One of the inner housing (60) and the outer housing (20) is provided with an engaging portion (67), and the other is provided with an engaged portion (26) for moving the inner housing (60) in a direction intersecting the advance/retreat direction by sliding in contact with the engaging portion (67).

6 Claims, 7 Drawing Sheets

(51) Int. Cl.
*H01R 13/24* (2006.01)
*H01R 13/453* (2006.01)
*H01R 12/71* (2011.01)

(52) U.S. Cl.
CPC ....... *H01R 13/4538* (2013.01); *H01R 12/714* (2013.01); *H01R 13/2471* (2013.01)

(56) References Cited

U.S. PATENT DOCUMENTS

2019/0310301 A1 10/2019 Kenzaki et al.
2020/0233041 A1 7/2020 Kenzaki et al.
2023/0143547 A1* 5/2023 Watanabe .............. H01R 13/52
439/135

FOREIGN PATENT DOCUMENTS

JP 2013-045550 A 3/2013
JP 5426272 B2 * 2/2014
JP 2018-092813 A 6/2018

OTHER PUBLICATIONS

International Search Report issued on Jun. 14, 2022 for WO 2022/220293 A1 (4 pages).

* cited by examiner

CONNECTOR WITH SLIDING CIRCUMFERENTIALLY ROTATING INNER HOUSING

CROSS REFERENCE TO RELATED APPLICATIONS

This application is a national phase of PCT application No. PCT/JP2022/017897, filed on 15 Apr. 2022, which claims priority from Japanese patent application No. 2021-069467, filed on 16 Apr. 2021, all of which are incorporated herein by reference.

TECHNICAL FIELD

The present disclosure relates to a connector.

BACKGROUND

Patent Document 1 discloses a probe pin provided with a terminal and a coil spring. The terminal is plate-like and engaged with and supported by the coil spring. An electrode contact portion is provided on a tip part of the terminal. The electrode contact portion is pressed into contact with an electrode to be inspected. A biasing force of the coil spring exceeds a predetermined value and the terminal is inclined in a plate width direction, whereby the electrode contact portion slides in contact with the electrode and the electrode is wiped.

PRIOR ART DOCUMENT

Patent Document

Patent Document 1: JP 2018-092813 A

SUMMARY OF THE INVENTION

Problems to be Solved

In the case of Patent Document 1, a plurality of the probe pins are provided to correspond to the number of the electrodes to be inspected. Each of the plurality of probe pins is provided with the terminal and the coil spring. Thus, the coil spring is necessary for each terminal, causing a problem of increasing cost. Further, that the shape of the terminal is restricted by the shape of the coil spring is also a factor for cost increase.

Accordingly, the present disclosure aims to provide a connector capable of reducing cost.

Means to Solve the Problem

The present disclosure is directed to a connector with an outer housing, an inner housing arranged movably in an advance/retreat direction with respect to the outer housing, a terminal held in the inner housing, a tip part of the terminal projecting from an end surface of the inner housing, and a biasing member arranged between the outer housing and the inner housing for biasing the inner housing toward an advance side, one of the inner housing and the outer housing being provided with an engaging portion, the other being provided with an engaged portion for moving the inner housing in a direction intersecting the advance/retreat direction by sliding in contact with the engaging portion.

Effect of the Invention

According to the present disclosure, it is possible to provide a connector capable of reducing cost.

DETAILED DESCRIPTION TO EXECUTE THE INVENTION

Description of Embodiments of Present Disclosure

Figure 1:
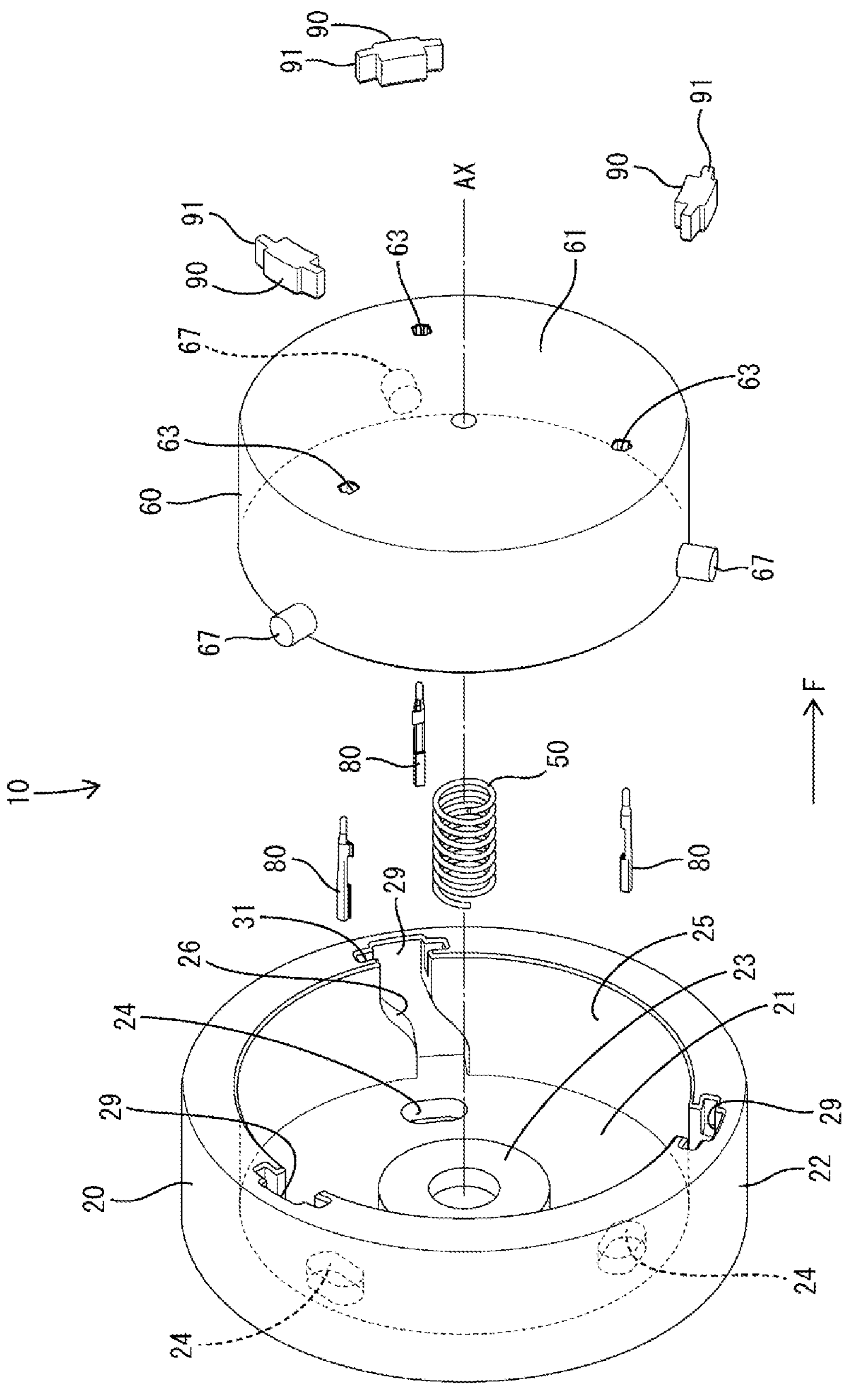
FIG. 1 is an exploded perspective view of a connector according to an embodiment of the present disclosure.

First, embodiments of the present disclosure are listed and described.

(1) The connector of the present disclosure is provided with an outer housing, an inner housing arranged movably in an advance/retreat direction with respect to the outer housing, a terminal held in the inner housing, a tip part of the terminal projecting from an end surface of the inner housing, and a biasing member arranged between the outer housing and the inner housing for biasing the inner housing toward an advance side, one of the inner housing and the outer housing being provided with an engaging portion, the other being provided with an engaged portion for moving the inner housing in a direction intersecting the advance/retreat direction by sliding in contact with the engaging portion.

According to the above configuration, since the inner housing is movable also in the direction intersecting the advance/retreat direction in addition to being movable in the advance/retreat direction with respect to the outer housing, the terminal held in the inner housing can also move in the direction intersecting the advance/retreat direction. In this way, the tip part of the terminal can be pressed against and slide in contact with a connection partner, whereby the connection partner can be wiped.

Here, since the terminal is held in the inner housing and the biasing member is arranged between the outer housing and the inner housing, the terminal and the biasing member can be structured not to affect each other. The number of the terminal(s) held in the inner housing can also be freely set regardless of the biasing member. Therefore, the structure of the connector including the terminal can be simplified and cost can be reduced.

(2) Preferably, the outer housing has a circumferential surface for sliding in contact with an outer peripheral surface of the inner housing, and the direction intersecting the advance/retreat direction is a circumferential direction along the circumferential surface.

According to the above configuration, since the inner housing can rotate in the circumferential direction along the circumferential surface of the outer housing, the enlargement of the connector can be suppressed as compared to the case where the inner housing moves in a radial direction or the like with respect to the outer housing.

(3) The biasing member may be a coil spring having a center axis at an axial center of the circumferential surface, and the inner housing may include a plurality of terminal holding portions at intervals about the center axis of the coil spring.

According to the above configuration, even if the terminal is held in each of the plurality of terminal holding portions, it is not necessary to provide a plurality of the biasing members and, preferably, one biasing member can handle such a case. As a result, the number of components can be reduced and cost can be further reduced.

(4) The engaged portion may be in the form of a groove extending in the direction intersecting the advance/retreat direction in the other of the inner housing and the outer housing.

According to the above configuration, the complication of the structure of the engaged portion can be suppressed.

(5) The other of the inner housing and the outer housing may be provided with a front engaged portion in the form of a groove communicating with an end part of the engaged portion on the advance side, and the front engaged portion may extend in the advance/retreat direction and receive the engaging portion when the inner housing is at an advance position.

According to the above configuration, since the front engaged portion extending in the advance/retreat direction receives the engaging portion when the inner housing is at the advance position, the biasing member can accumulate a biasing force and a contact pressure suitable for the wiping of the terminal can be reached until the terminal starts a wiping movement.

(6) The other of the inner housing and the outer housing may be provided with a rear engaged portion in the form of a groove communicating with an end part of the engaged portion on a side opposite to the advance side, and the rear engaged portion may extend in the advance/retreat direction and receive the engaging portion when the inner housing is at an retreat position.

According to the above configuration, since the rear engaged portion extending in the advance/retreat direction receives the engaging portion when the inner housing is at the retreat position, the inner housing can be moved within a movable range due to a tolerance of a locking mechanism or the like when the wiping movement of the terminal is completed and a module or the like incorporated with the connector is locked to a mating module.

Details of Embodiment of Present Disclosure

A specific example of an embodiment of the present disclosure is described below with reference to the drawings. Note that the present invention is not limited to this illustration, but is represented by claims and intended to include all changes in the scope of claims and in the meaning and scope of equivalents.

Figure 5:
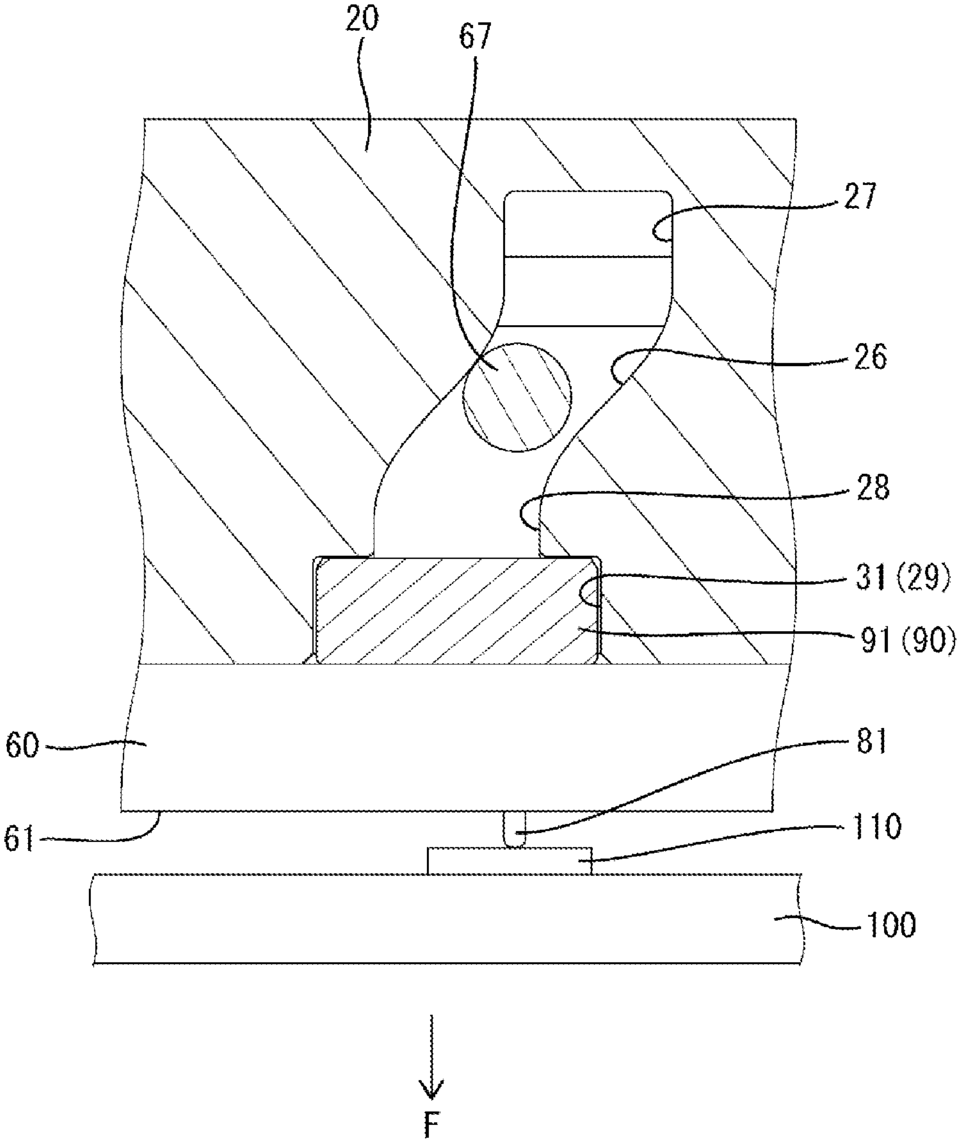
FIG. 5 is an enlarged section showing a state where the engaging portion slides in contact with the engaged portion in the process of moving the inner housing from the advance position to a retreat position.

A connector 10 according to the embodiment is, as shown in FIG. 1, provided with an outer housing 20, an inner housing 60, a coil spring 50, a plurality of terminals 80 and a plurality of stoppers 90. Further, the connector 10 is incorporated into an unillustrated module. The module is fit and connected to an unillustrated mating module. The module and the mating module are held in a state connected to each other by lock portions provided therein. The mating module is provided with mating connecting portions 110 serving as connection partners of the terminals 80. In the case of this embodiment, electrically conductive paths on a circuit board 100 are illustrated as the mating connecting portions 110 as shown in FIG. 5.

Figure 2:
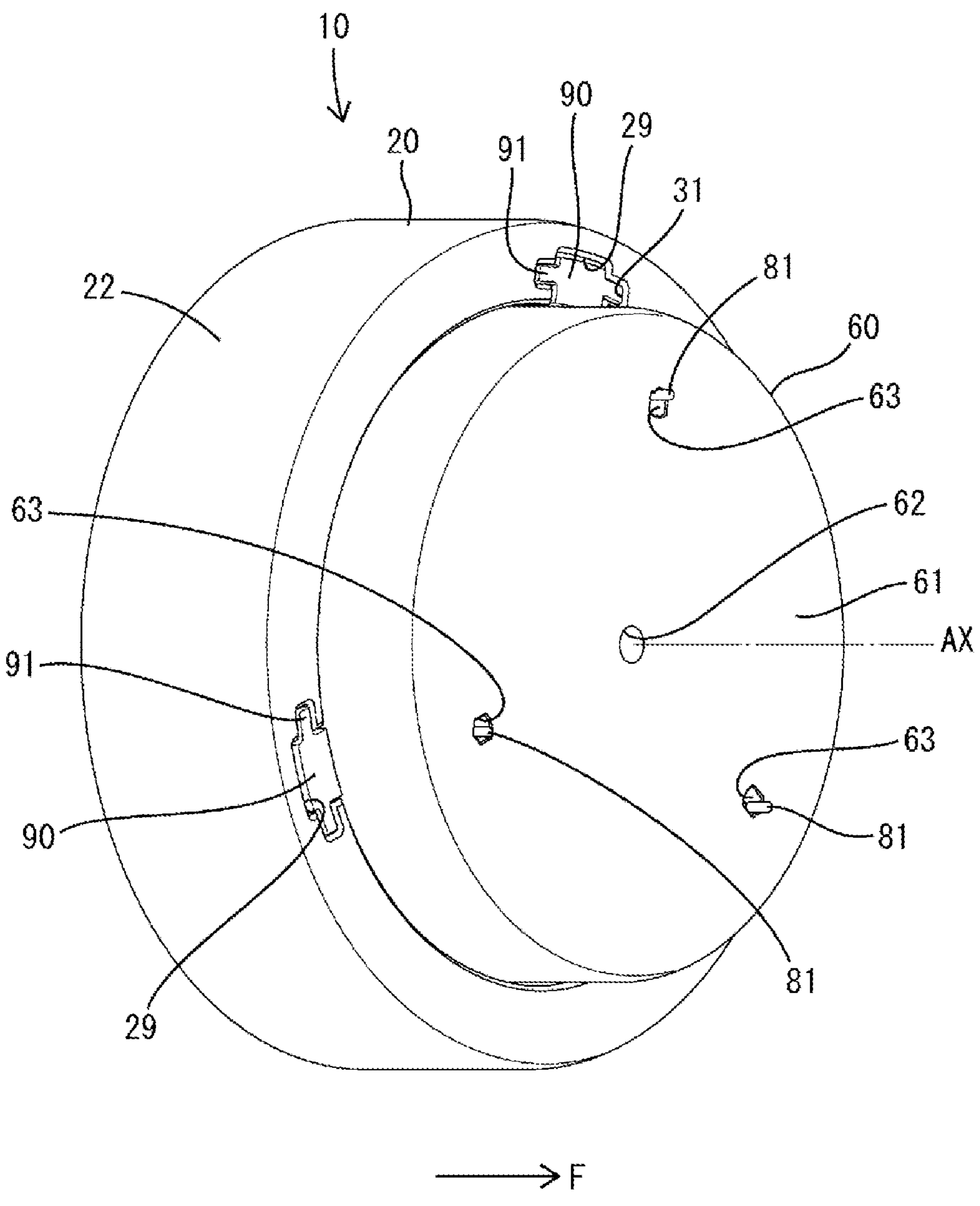
FIG. 2 is a perspective view of the connector.
Figure 3:
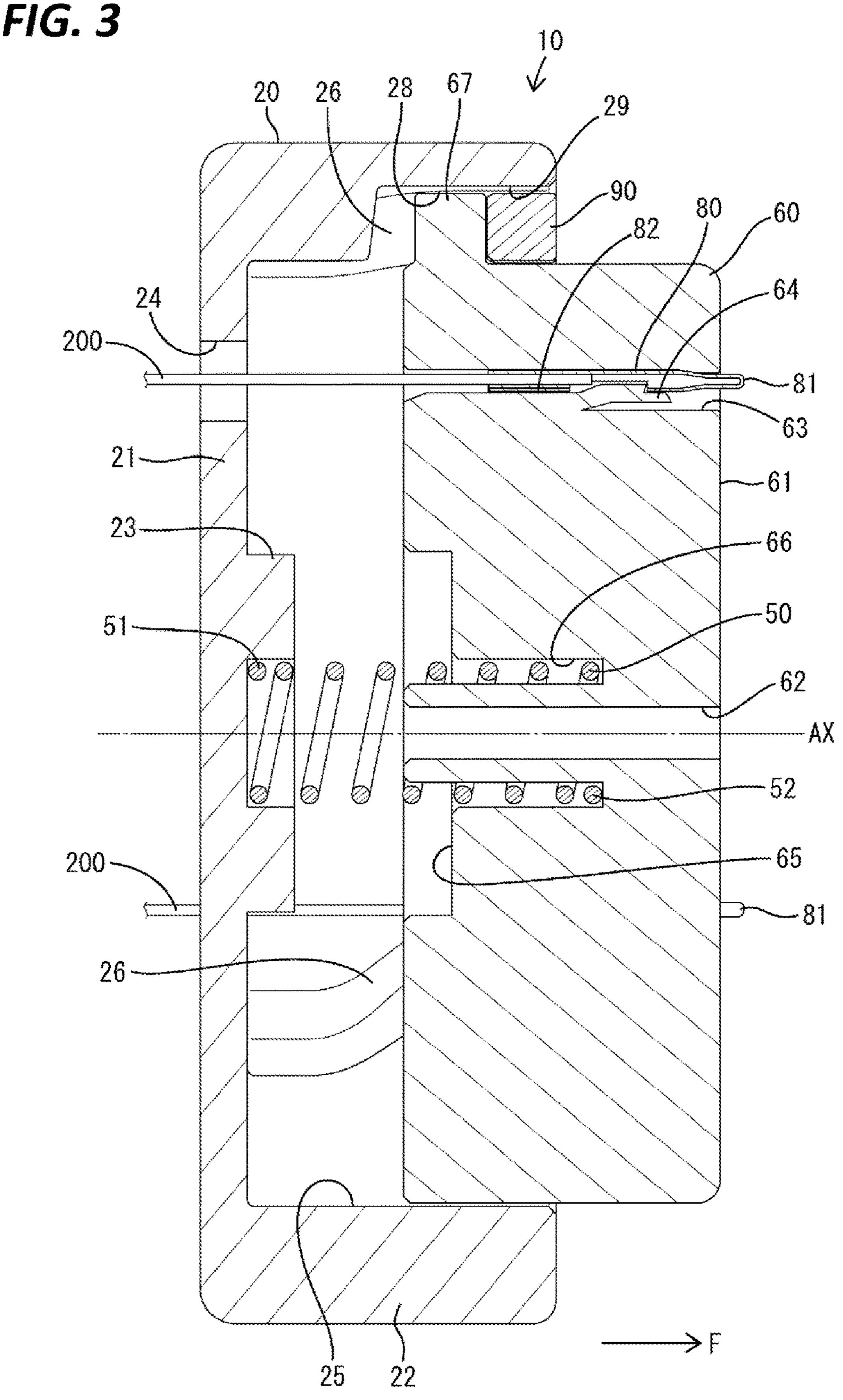
FIG. 3 is a section of the connector.

As shown in FIG. 2, the inner housing 60 is mounted into the outer housing 20. As shown in FIG. 3, the coil spring 50 is interposed and arranged between the inner housing 60 and the outer housing 20. The inner housing 60 is relatively movable, with respect to the outer housing 20, to an advance position (see FIGS. 2, 3 and 4) where the outer housing 20 advances according to a biasing force of the coil spring 50 and a retreat position (see FIG. 6) where the inner housing 60 retreats into the outer housing 20 against the biasing force of the coil spring 50.

Further, the plurality of terminals 80 are held in the inner housing 60. Each of the plurality of stoppers 90 is provided for each terminal 80 and restrict each terminal 80 from coming out from the inner housing 60. Note that, in the following description, a front-rear direction corresponds to an advance/retreat direction of the inner housing 60 from and into the outer housing 20, and an advance side of the inner housing 60 is a front side (see an arrow F in figures). Further, a circumferential direction is a direction about an axial center AX of the connector 10. Note that the axial center AX is a center axis parallel to the front-rear direction in the connector 10 and corresponds to radial centers of the outer housing 20 and the inner housing 60.

<Outer Housing>

The outer housing 20 is made of synthetic resin. As shown in FIG. 1, the outer housing 20 is cap-like and includes a disk-like back surface portion 21 and a hollow cylindrical outer peripheral portion 22 projecting forward from the outer periphery of the back surface portion 21. An annular outer spring mounting portion 23 is provided to project in a central part of the front surface of the back surface portion 21. As shown in FIG. 3, a later-described outer mounting portion 51 of the coil spring 50 is fit and supported in a recess of the outer spring mounting portion 23.

A plurality of wire insertion holes 24 are provided at intervals in the circumferential direction through the back surface portion 21. The respective wire insertion holes 24 are arranged at three equally spaced-apart positions in the circumferential direction in the back surface portion 21. Each wire insertion hole 24 is formed into a hole long in the circumferential direction. A wire 200 connected to the terminal 80 is inserted with a play into each wire insertion hole 24.

The outer peripheral portion 22 has a circumferential surface 25 on an inner periphery. A plurality of engaged portions 26 are provided at intervals in the circumferential direction by recessing the circumferential surface 25 of the outer peripheral portion 22. The respective engaged portions 26 are arranged at three equally spaced-apart positions in the circumferential direction in the circumferential surface 25 of the outer peripheral portion 22. The engaged portion 26 is in the form of a groove extending in an inclination direction intersecting the front-rear direction. Specifically, as shown in FIG. 5, the engaged portion 26 is inclined with respect to the front-rear direction to be displaced toward one side in the circumferential direction (right side of FIG. 5) toward a rear side.

A plurality of rear engaged portions 27 are provided behind the respective engaged portions 26 by recessing the circumferential surface 25 of the outer peripheral portion 22.

The rear engaged portion 27 is in the form of a groove extending in the front-rear direction in the circumferential surface 25 of the outer peripheral portion 22, the front end thereof communicates with the engaged portion 26 in a curved manner and the rear end thereof is closed along the circumferential direction. The rear engaged portion 27 and the wire insertion hole 24 are arranged at positions overlapping each other in the circumferential direction. A length in the front-rear direction of the rear engaged portion 27 is shorter than a length in the inclination direction of the engaged portion 26.

A plurality of front engaged portions 28 are provided in front of the respective engaged portions 26 by recessing the circumferential surface 25 of the outer peripheral portion 22. The front engaged portion 28 is in the form of a groove extending in the front-rear direction in the circumferential surface 25 of the outer peripheral portion 22, the rear end thereof communicates with the engaged portion 26 in a curved manner and the front end thereof communicates with a step portion 31 of a later-described stopper receiving portion 29 in a stepped manner. A length in the front-rear direction of the front engaged portion 28 is shorter than the length in the inclination direction of the engaged portion 26.

A plurality of the stopper receiving portions 29 are provided in front of the respective front engaged portions 28 by recessing the circumferential surface 25 of the outer peripheral portion 22. The stopper receiving portion 29 is in the form of a groove extending forward from the front engaged portion 28 in the circumferential surface 25 of the outer peripheral portion 22, and the front end thereof is open in the front end of the outer peripheral portion 22. As shown in FIG. 1, the stopper receiving portion 29 includes the step portion 31 having a rectangular cross-section widened in the circumferential direction.

<Inner Housing>

The inner housing 60 is made of synthetic resin. As shown in FIG. 2, the inner housing 60 has a cylindrical shape and is fit into the outer housing 20. The outer peripheral surface of the inner housing 60 can slide along the circumferential surface 25 of the outer housing 20 in the circumferential direction. The inner housing 60 has a radially extending end surface 61 on a front surface. An axial center hole 62 penetrating in the front-rear direction is provided in a radial center of the inner housing 60. The inner housing 60 is provided with a plurality of terminal holding portions 63 at intervals in the circumferential direction. The respective terminal holding portions 63 are arranged at three equally spaced-apart positions in the circumferential direction in the inner housing 60. As shown in FIG. 3, the terminal holding portion 63 is a through hole extending in the front-rear direction and includes a resiliently deformable locking lance 64 projecting forward. With the inner housing 60 assembled with the outer housing 20, the terminal holding portions 63 and the wire insertion holes 24 are coaxially arranged in the front-rear direction.

Figure 7:
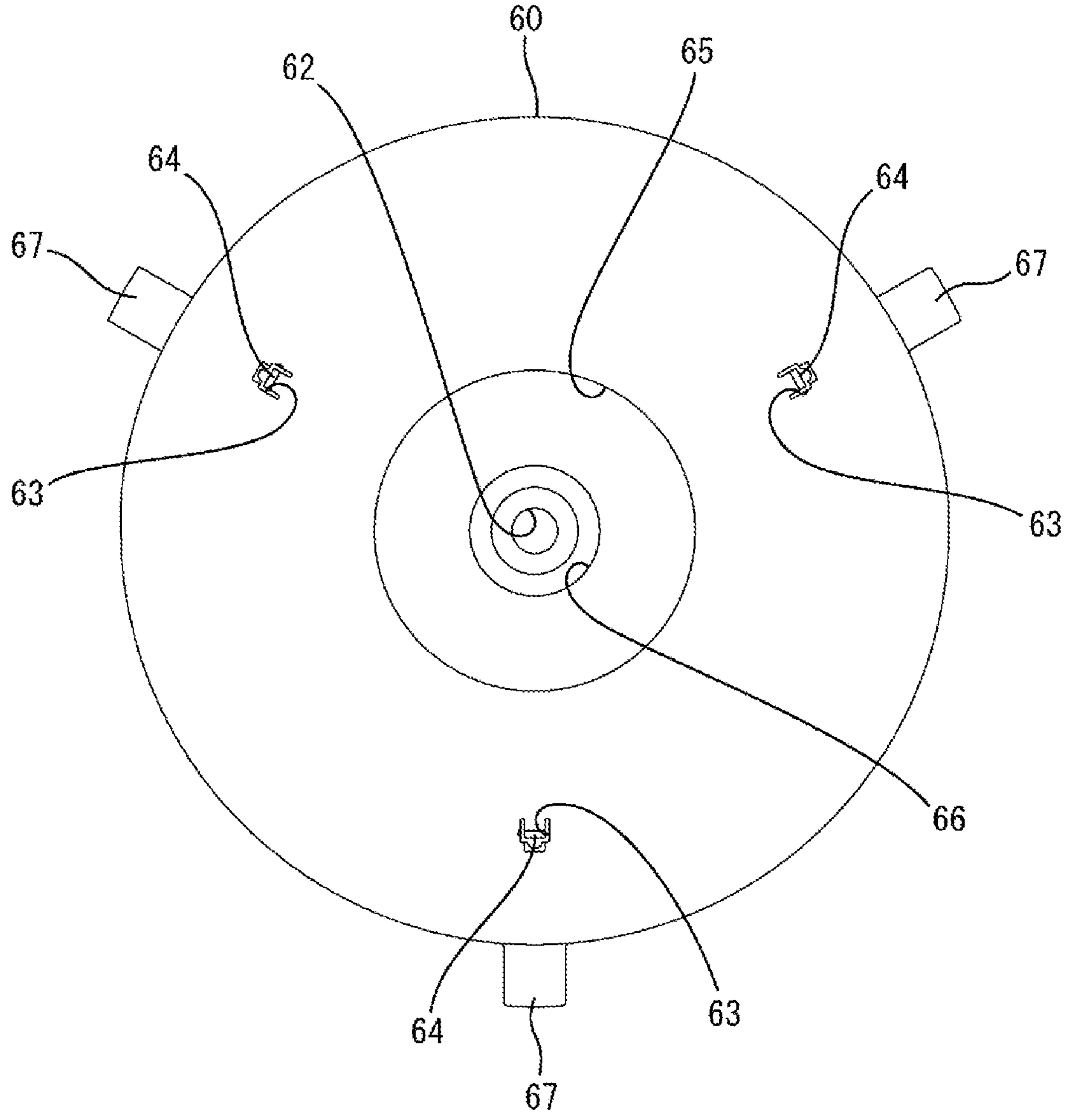
FIG. 7 is a back view of the inner housing.

As shown in FIG. 7, a fitting recess 65 annular in a back view is provided to be open in the rear surface of the inner housing 60. The fitting recess 65 has a center at the axial center AX of the inner housing 60 where the axial center hole 62 is located. The outer spring mounting portion 23 of the outer housing 20 is fit and inserted into the fitting recess 65. The respective terminal holding portions 63 are arranged radially outward of the fitting recess 65.

An inner spring mounting portion 66 annular in a back view is provided to be open in the back surface of the fitting recess 65 in the rear surface of the inner housing 60. The inner spring mounting portion 66 is concentric with the fitting recess 65 and has a center at the axial center AX of the inner housing 60. As shown in FIG. 3, the inner spring mounting portion 66 extends long forward from the back surface of the fitting recess 65 and the front end thereof is closed at an intermediate part in the front-rear direction of the inner housing 60. A later-described inner mounting portion 52 of the coil spring 50 is fit and mounted into the inner spring mounting portion 66. A radial opening width of the inner spring mounting portion 66 corresponds to a diameter of the coil spring 50.

As shown in FIG. 1, a plurality of engaging portions 67 are provided to project at intervals in the circumferential direction on a rear end part of the outer peripheral surface of the inner housing 60. The respective engaging portions 67 are arranged at three equally spaced-apart positions in the circumferential direction on the outer peripheral surface of the inner housing 60. The engaging portion 67 is in the form of a pin having a circular cross-section and projects radially outward. With the inner housing 60 assembled with the outer housing 20, the engaging portions 67 are arranged to be movable inside the front engaged portions 28, the engaged portions 26 and the rear engaged portions 27. The engaging portions 67 and the terminal holding portions 63 are arranged at positions overlapping each other in the circumferential direction.

<Coil Spring>

A compression coil spring made of metal is illustrated as the coil spring 50. As shown in FIG. 3, the coil spring 50 includes the outer mounting portion 51 to be mounted into the recess of the outer spring mounting portion 23 of the outer housing 20 in a rear end part and the inner mounting portion 52 to be mounted into the inner spring mounting portion 66 of the inner housing 60 in a front end part. The outer peripheral surface of the outer mounting portion 51 is arranged along the inner peripheral surface of the recess of the outer spring mounting portion 23. The inner and outer peripheral surfaces of the inner mounting portion 52 are respectively arranged along the inner and outer peripheral surface of the inner spring mounting portion 66. When the inner housing 60 is at the advance position, the coil spring 50 is arranged in a natural or slightly compressed state between the outer housing 20 and the inner housing 60. As shown in FIG. 2, a front part of the inner housing 60 is arranged to project forward from the outer housing 20. In contrast, when the inner housing 60 is at the retreat position, the coil spring 50 is arranged in a strongly compressed state between the outer housing 20 and the inner housing 60. The inner housing 60 projects less from the outer housing 20 than at the advance position or is arranged to entirely retreat into the outer housing 20.

<Terminals>

The terminal 80 is made of metal excellent in electrical conductivity and has a shape elongated in the front-rear direction. As shown in FIG. 3, the terminal 80 includes a tab-like or pin-like connecting portion 81 projecting forward and a barrel-like crimping portion 82 located behind the connecting portion 81 and to be crimped to an end part of a wire 200. The terminal 80 is inserted into the terminal holding portion 63 and retained in the terminal holding portion 63 by locking the locking lance 64 to the rear end of the connecting portion 81. With the terminal 80 locked by the locking lance 64, the tip of the connecting portion 81 is arranged to project forward from the end surface 61 of the inner housing 60. The wire 200 connected to the crimping portion 82 is pulled out rearward from the rear surface of the inner housing 60. Further, with the inner housing 60 assembled with the outer housing 20, the wire 200 is pulled out rearward from the wire insertion hole 24 of the outer housing 20.

<Stoppers>

The stopper 90 is made of synthetic resin and, as shown in FIG. 2, shaped to be fittable into the stopper receiving portion 29 of the outer housing 20. The stopper 90 includes a widened portion 91 protruding toward both sides in the circumferential direction from a body part. The widened portion 91 of the stopper 90 is press-fit into and fixed to the step portion 31 of the stopper receiving portion 29.

<Connection Structure of Connector>

Figure 4:
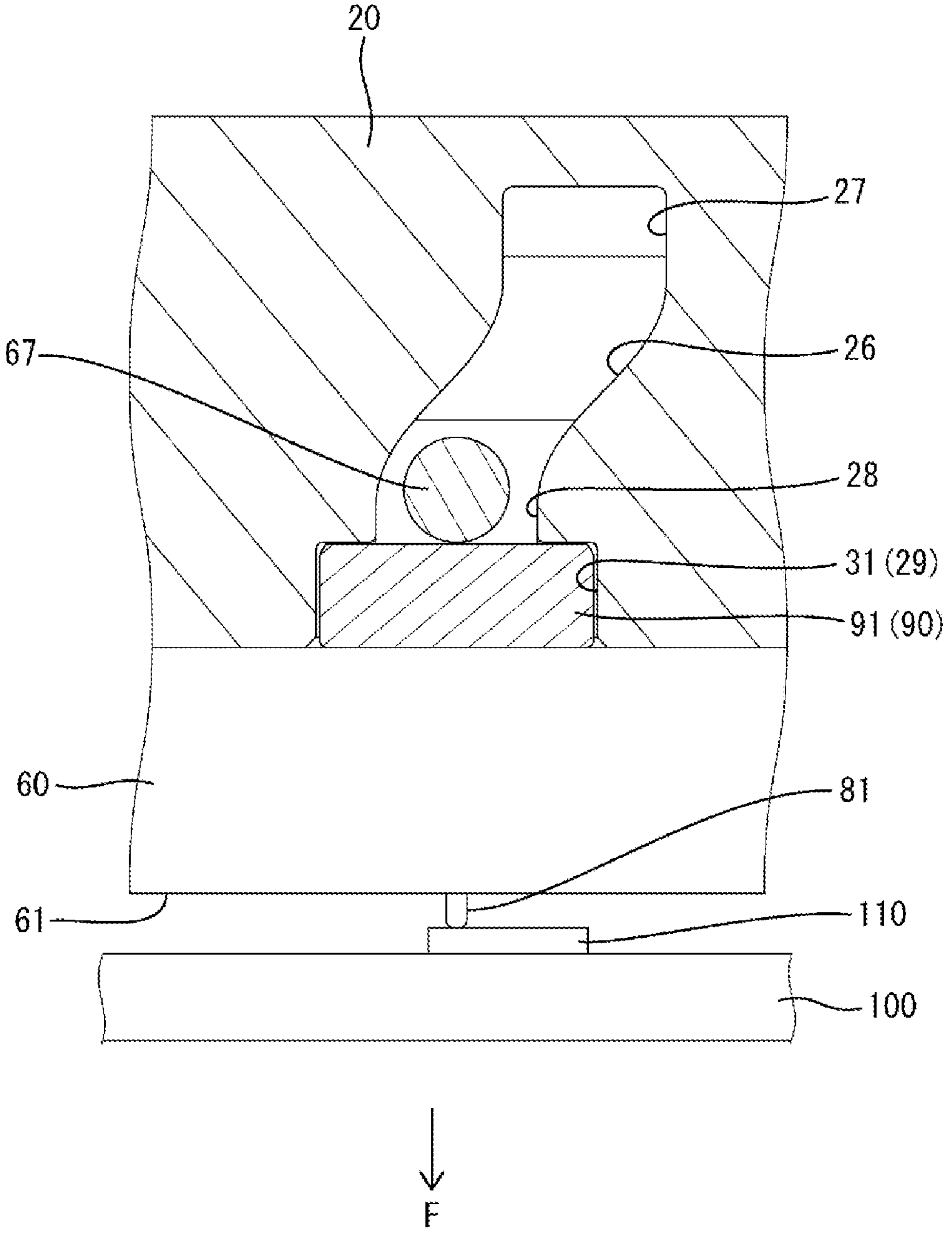
FIG. 4 is an enlarged section showing a state where an engaging portion is received in a front engaged portion when an inner housing is at an advance position.

First, the terminals 80 connected to the end parts of the wires 200 are inserted through the wire insertion holes 24 of the outer housing 20 and, from that state, the terminals 80 connected to the end parts of the wires 200 are inserted into and held in the terminal holding portions 63 of the inner housing 60. Subsequently, the inner housing 60 is fit from front into the inside of the outer peripheral portion 22 of outer housing 20 while the coil spring 50 is interposed between the outer housing 20 and the inner housing 60. At this time, the engaging portions 67 of the inner housing 60 are inserted into the front engaged portions 28 of the outer housing 20. Subsequently, the stoppers 90 are press-fit into the stopper receiving portions 29. As shown in FIGS. 3 and 4, the inner housing 60 is restricted from coming out forward from the outer housing 20 by the contact of the engaging portions 67 with the stoppers 90 from behind. The inner housing 60 can maintain a state where the engaging portions 67 are in contact with the stoppers 90 by being biased by the coil spring 50. In this way, the inner housing 60 is kept at the advance position where the front part of the inner housing 60 projects from the outer housing 20.

Subsequently, the module is fit to the mating module. At the start of fitting the module, the connecting portions 81 of the terminals 80 are butted against the mating connecting portions 110 and the inner housing 60 is retracted against the biasing force of the coil spring 50. While the inner housing 60 is retracted, the engaging portions 67 move the front engaged portions 28 rearward and the coil spring 50 is compressed, thereby accumulating the biasing force in the coil spring 50. The connecting portions 81 of the terminals 80 gradually increase contact pressures with the mating connecting portions 110 by receiving the biasing force of the coil spring 50.

As the module is further fit, the engaging portions 67 enter the engaged portions 26 and slide on groove surfaces of the engaged portions 26 as shown in FIG. 5. In this way, a rotational force is applied to the inner housing 60 and the inner housing 60 rotates about the axial center AX with respect to the outer housing 20. If the inner housing 60 rotates, the terminals 80 held in the terminal holding portions 63 of the inner housing 60 are also displaced about the axial center AX and the tip parts of the terminals 80 slide toward the one side in the circumferential direction on the surfaces of the mating connecting portions 110 while receiving the biasing force of the coil spring 50. In this way, the surfaces of the mating connecting portions 110 are wiped to remove oxide films and the like.

Figure 6:
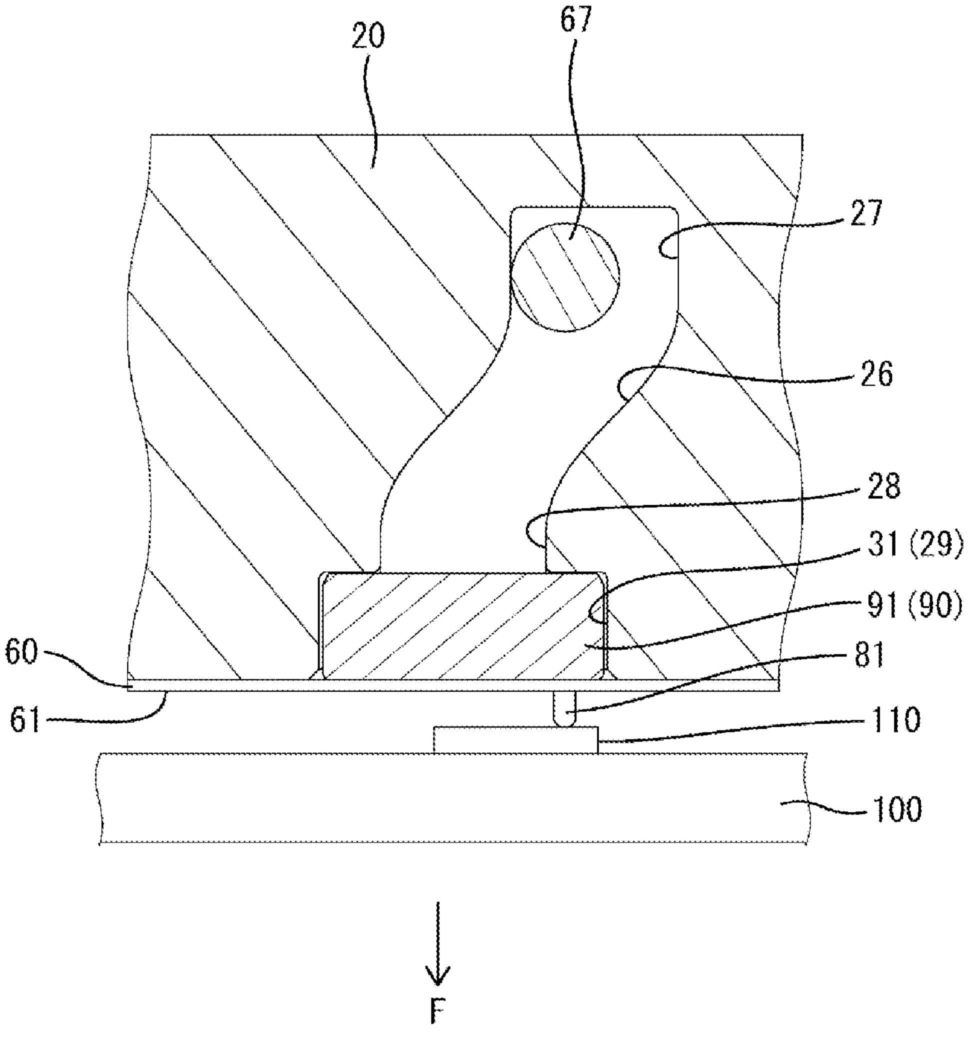
FIG. 6 is an enlarged section showing a state where the engaging portion is received in a rear engaged portion when the inner housing is at the retreat position.

Further, while the module is being further fit, the front surface of the back surface portion 21 of the outer housing 20 and the rear surface of the inner housing 60 approach each other and the inner housing 60 moves toward the retreat position. When the module is properly fit to the mating module, the both modules are held in a fit state by a locking action of the lock portions thereof. At this time, the front surface of the back surface portion 21 of the outer housing 20 and the rear surface of the inner housing 60 are closely facing each other and the outer spring mounting portion 23 of the outer housing 20 is fit into the fitting recess 65. In this way, the inner housing 60 reaches the retreat position and, as shown in FIG. 6, the engaging portions 67 enter the rear engaged portions 27. Since the rear engaged portions 27 are shaped to extend in the front-rear direction, no rotational force is applied to the inner housing 60. Thus, the inner housing 60 is maintained in a state not to rotate about the axial center AX. In contrast, the both modules are displaceable in the front-rear direction within a movable range given by tolerances of the lock portions and the like. Thus, the inner housing 60 can move in the front-rear direction with respect to the outer housing 20 at the retreat position. While the inner housing 60 is moving at the retreat position, a state where the connecting portions 81 of the terminals 80 are in contact with the mating connecting portions 110 at certain positions can be maintained.

As described above, according to this embodiment, since the inner housing 60 is movable in the circumferential direction in addition to being movable in the front-rear direction with respect to the outer housing 20, the tip parts of the terminals 80 can wipe the surfaces of the mating connecting portions 110 by sliding on these surfaces.

Further, since the plurality of terminals 80 are held in the inner housing 60 and the coil spring 50 is arranged between the outer housing 20 and the inner housing 60, the shape and arrangement of the terminals 80 are not affected by the coil spring 50. As a result, the structure of the connector 10 including the terminals 80 can be simplified and, consequently, cost can be reduced. Particularly, since it is not necessary to provide a plurality of the coil springs 50 for the plurality of terminals 80 and one coil spring 50 can handle the plurality of terminals 80, the number of components can be reduced.

Moreover, in the case of this embodiment, the inner housing 60 can rotate in the circumferential direction inside the circumferential surface 25 of the outer housing 20. Thus, the enlargement of the connector 10 can be suppressed as compared to the case where the inner housing 60 moves in a radial direction or the like with respect to the outer housing 20.

Further, since the front engaged portions 28 extending in the front-rear direction receive the engaging portions 67 when the inner housing 60 is at the advance position, the coil spring 50 can accumulate a biasing force and a contact pressure suitable for the wiping of the terminals 80 is reached until the terminals 80 start wiping movements.

Furthermore, since the rear engaged portions 27 extending in the front-rear direction receive the engaging portions 67 when the inner housing 60 is at the retreat position, the inner housing 60 can be moved within the movable range due to the tolerances of the lock portions and the like when the terminals 80 complete the wiping movements and the module incorporated with the connector 10 is locked to the mating module. As a result, the connecting portions 81 of the terminals 80 can satisfactorily contact the mating connecting portions 110.

Other Embodiments of Present Disclosure

The embodiment disclosed this time should be considered illustrative in all aspects, rather than restrictive.

In the case of the above embodiment, the projection-like engaging portions are formed on the inner housing and the recess-like engaged portions are formed in the outer housing. However, according to another embodiment, projection-like engaging portions may be formed on the outer housing and recess-like engaged portions may be formed in the inner housing.

In the case of the above embodiment, the inner housing is movable in the circumferential direction orthogonal to the front-rear direction and radial direction with respect to the outer housing. However, according to another embodiment, the inner housing only has to be movable in a direction intersecting the front-rear direction with respect to the outer housing and may be movable, for example, in the radial direction.

In the case of the above embodiment, the connection partner of the terminal is the mating connecting portion of the circuit board. However, according to another embodiment, the connection partner of the terminal is not limited to the one on the circuit board and may be, for example, a connection terminal or busbar.

In the case of the above embodiment, the coil spring is arranged between the inner housing and the outer housing. However, according to another embodiment, it is enough to arrange a biasing member between the inner housing and the outer housing and, for example, a leaf spring or cushion may be arranged.

In the case of the above embodiment, one biasing member is provided in one connector. However, according to another embodiment, a plurality of biasing members may be provided in one connector.

LIST OF REFERENCE NUMERALS

10 . . . connector
20 . . . outer housing
21 . . . back surface portion
22 . . . outer peripheral portion
23 . . . outer spring mounting portion
24 . . . wire insertion hole
25 . . . circumferential surface
26 . . . engaged portion
27 . . . rear engaged portion
28 . . . front engaged portion
29 . . . stopper receiving portion
31 . . . step portion
50 . . . coil spring (biasing member)
51 . . . outer mounting portion
52 . . . inner mounting portion
60 . . . inner housing
61 . . . end surface
62 . . . axial center
63 . . . terminal holding portion
64 . . . locking lance
65 . . . fitting recess
66 . . . inner spring mounting portion
67 . . . engaging portion
80 . . . terminal
81 . . . connecting portion
82 . . . crimping portion
90 . . . stopper
91 . . . widened portion
100 . . . circuit board
110 . . . mating connecting portion
200 . . . wire
AX . . . axial center
F . . . front side

What is claimed is:

1. A connector, comprising:
an outer housing;
an inner housing arranged movably in an advance/retreat direction with respect to the outer housing;
a terminal held in the inner housing, a tip part of the terminal projecting from an end surface of the inner housing; and
a biasing member arranged between the outer housing and the inner housing for biasing the inner housing toward an advance side,
one of the inner housing and the outer housing being provided with an engaging portion, the other being provided with an engaged portion for moving the inner housing in a direction intersecting the advance/retreat direction by sliding in contact with the engaging portion.

2. The connector of claim 1, wherein:
the outer housing has a circumferential surface for sliding in contact with an outer peripheral surface of the inner housing, and
the direction intersecting the advance/retreat direction is a circumferential direction along the circumferential surface.

3. The connector of claim 2, wherein:
the biasing member is a coil spring having a center axis at an axial center of the circumferential surface, and
the inner housing includes a plurality of terminal holding portions at intervals about the center axis of the coil spring.

4. The connector of claim 1, wherein the engaged portion is in the form of a groove extending in the direction intersecting the advance/retreat direction in the other of the inner housing and the outer housing.

5. The connector of claim 4, wherein:
the other of the inner housing and the outer housing is provided with a front engaged portion in the form of a groove communicating with an end part of the engaged portion on the advance side, and
the front engaged portion extends in the advance/retreat direction and receives the engaging portion when the inner housing is at an advance position.

6. The connector of claim 4, wherein:
the other of the inner housing and the outer housing is provided with a rear engaged portion in the form of a groove communicating with an end part of the engaged portion on a side opposite to the advance side, and
the rear engaged portion extends in the advance/retreat direction and receives the engaging portion when the inner housing is at an retreat position.

* * * * *